US009288652B2

(12) United States Patent
Yuasa (10) Patent No.: US 9,288,652 B2
(45) Date of Patent: Mar. 15, 2016

(54) METHOD FOR ESTABLISHING HIGH-SPEED COMMUNICATION PROTOCOL AND DEVICE THEREOF

(71) Applicant: AZAPA R&D Americas, Inc, Torrance, CA (US)

(72) Inventor: Go Yuasa, Rancho Palos Verdes, CA (US)

(73) Assignee: AZAPA R&D Americas, Inc., Torrance, CA (US)

( * ) Notice: Subject to any disclaimer, the term of this patent is extended or adjusted under 35 U.S.C. 154(b) by 5 days.

(21) Appl. No.: 14/454,540

(22) Filed: Aug. 7, 2014

(65) Prior Publication Data

US 2015/0050906 A1    Feb. 19, 2015

Related U.S. Application Data

(60) Provisional application No. 61/866,646, filed on Aug. 16, 2013, provisional application No. 61/905,153, filed on Nov. 15, 2013.

(51) Int. Cl.
*H04W 4/22* (2009.01)
*H04W 4/02* (2009.01)
*H04W 4/04* (2009.01)

(52) U.S. Cl.
CPC *H04W 4/22* (2013.01); *H04W 4/02* (2013.01); *H04W 4/046* (2013.01)

(58) Field of Classification Search
None
See application file for complete search history.

(56) References Cited

U.S. PATENT DOCUMENTS

| 7,046,168 | B2 * | 5/2006 | Tsuboi | G08G 1/096716 340/425.5 |
| 8,208,891 | B2 * | 6/2012 | Jacobs | H04W 4/22 370/310.2 |
| 2005/0037730 | A1 * | 2/2005 | Montague | B60R 25/1004 455/404.2 |
| 2005/0088318 | A1 * | 4/2005 | Liu | G08G 1/161 340/902 |
| 2012/0282876 | A1 * | 11/2012 | Yuasa | H04W 4/22 455/404.1 |
| 2012/0294238 | A1 * | 11/2012 | Uhler | H04W 4/021 370/328 |
| 2013/0122851 | A1 * | 5/2013 | Michaelis | H04W 76/007 455/404.2 |
| 2013/0158778 | A1 * | 6/2013 | Tengler | G08G 1/096716 701/31.5 |
| 2013/0303143 | A1 * | 11/2013 | Schrader | H04M 1/72577 455/418 |
| 2013/0337787 | A1 * | 12/2013 | Yamada | H04B 10/11 455/414.1 |
| 2014/0187149 | A1 * | 7/2014 | Lortz | H04W 4/008 455/41.1 |

FOREIGN PATENT DOCUMENTS

JP          2013-238961 A    11/2013
WO       WO2014073148 A1    5/2014

* cited by examiner

*Primary Examiner* — Hilina K Demeter
(74) *Attorney, Agent, or Firm* — Baba Patent Agency (57) ABSTRACT

A method for establishing a communication between a first communication device in a first vehicle and a second communication device in a second vehicle, the method including the steps of, determining whether a mobile phone service is available, obtaining, a current position information of the first vehicle, setting, by the first communication device, a communication mode of the first communication device into an access point mode, transmitting, by the first communication device, ID information and the current position information of the first vehicle, recording, by the second communication device, the ID information and the position information of the first vehicle, transmitting, by the second communication device, the ID information of the first vehicle and position information of the second vehicle via a mobile phone to a service authority, when the second communication device fails to receive the position information of the first vehicle.

7 Claims, 9 Drawing Sheets

FIG. 8 ial application claims priority from U.S. Provisional Patent Application Ser. No. 61/866,646 filed, Aug. 16, 2013 and U.S. Provisional Patent Application Ser. No. 61/905,153 filed Nov. 15, 2013 the contents of which are incorporated herein by reference in its entirety.

METHOD FOR ESTABLISHING HIGH-SPEED COMMUNICATION PROTOCOL AND DEVICE THEREOF

This non-provisional application claims priority from U.S. Provisional Patent Application Ser. No. 61/866,646 filed, Aug. 16, 2013 and U.S. Provisional Patent Application Ser. No. 61/905,153 filed Nov. 15, 2013 the contents of which are incorporated herein by reference in its entirety.

TECHNICAL FIELD

The present invention relates to a method for establishing high-speed communication protocol and a device thereof, particularly relates to a method for establishing high-speed communication protocol utilized in emergency communication system and device thereof outside phone service area.

BACKGROUND OF THE INVENTION

In recent years, mobile phones so called smart phones having a capability for sending and receiving voice, text and digital data become a main stream of personal communication devices. Also, a GPS (Global Positioning System) becomes a standard device to be installed in the vehicles.

However, in the case of mobile phone systems using radio communication technologies, still there are lots of areas which cannot be covered by the mobile phone service areas, particularly, in deep mountain areas and desert areas having less population not only in North America, but also in European countries and Asian countries.

Accordingly, emergency communication systems or devices for transmitting and receiving information via radio wave which can be used in these areas which cannot be covered by mobile phone serves are required. In order to establish communications between these emergency communication devices in a vehicle involving an emergency event and vehicles passing by the vehicle involving the emergency event, high speed communication protocol is required particularly when establishing communication between communication devices having relatively short communication distance, such as Wi-Fi® or Wi-Fi-Direct® or the like.

SUMMARY OF THE INVENTION

An emergency communication device, which is installed in a vehicle involving an emergency event that is located outside of a wireless network service area, may attempt to send a message to an intended recipient. The intended recipient may include a service authority for helping the vehicle involving an emergency event by dispatching a service vehicle. At first, the communicating device determines that the communication device has no access to the wireless network, which may include a wireless phone network. The emergency communication device, then make a determination whether any vehicles are likely to be within a communication range of the emergency communication device. If vehicles are determined to be within the communication range, the communicating device may send the message via a broad band communication medium, such as Wi-Fi Direct® or the like, but not limited to.

A second communication device installed in a second vehicle may receive the message via the broad band communication medium when the second communication device is within the communication distance of the emergency communication device in the first vehicle. In this instance, since the communication distance is relatively short, such as several hundred meters, the second communication device likely to fail obtaining necessary information of the vehicle involving the emergency event, for example, VIN (Vehicle Identification Number), GPS (Global Positioning System) information including positioning information where the vehicle involving the emergency event is located, time when the emergency event information is transmitted from the vehicle involving the emergency event or the like.

In this instance, the second emergency communication device puts the position information from the GPS installed in the second vehicle instead of that from the first vehicle. Since the communication distance of the emergency communication device is several hundred meters, the service person of the service authority is relatively easy to find the vehicle involving the emergency event by using the position information of the second car which is at within the communication distance being several hundred meters. In order to find whether the position information sent to the service authority is from the vehicle involving the emergency event or from the second vehicle having passed through the communication distance area, the flag bit controlled by the second emergency communication device is provided in the information area to be sent to the service authority.

According to an embodiment of the present invention, the possibility for receiving the emergency communication from the vehicle in the area outside the wireless network service area can be improved.

Another aspect of the present invention is an emergency communication device in which a service set identifier (SSID) includes ID information (VIN (Vehicle Identification Number) and the position information of the vehicle as a part of SSID so that the important emergency information is transmitted as a part of SSID in the very first portion when the emergency communication device is activated in the emergency vehicle when the emergency event occurs. Thus, the important emergency information can be successfully transmitted to the second vehicle in a relatively short communication distance.

DETAILED DESCRIPTION OF INVENTION

Figure 1:
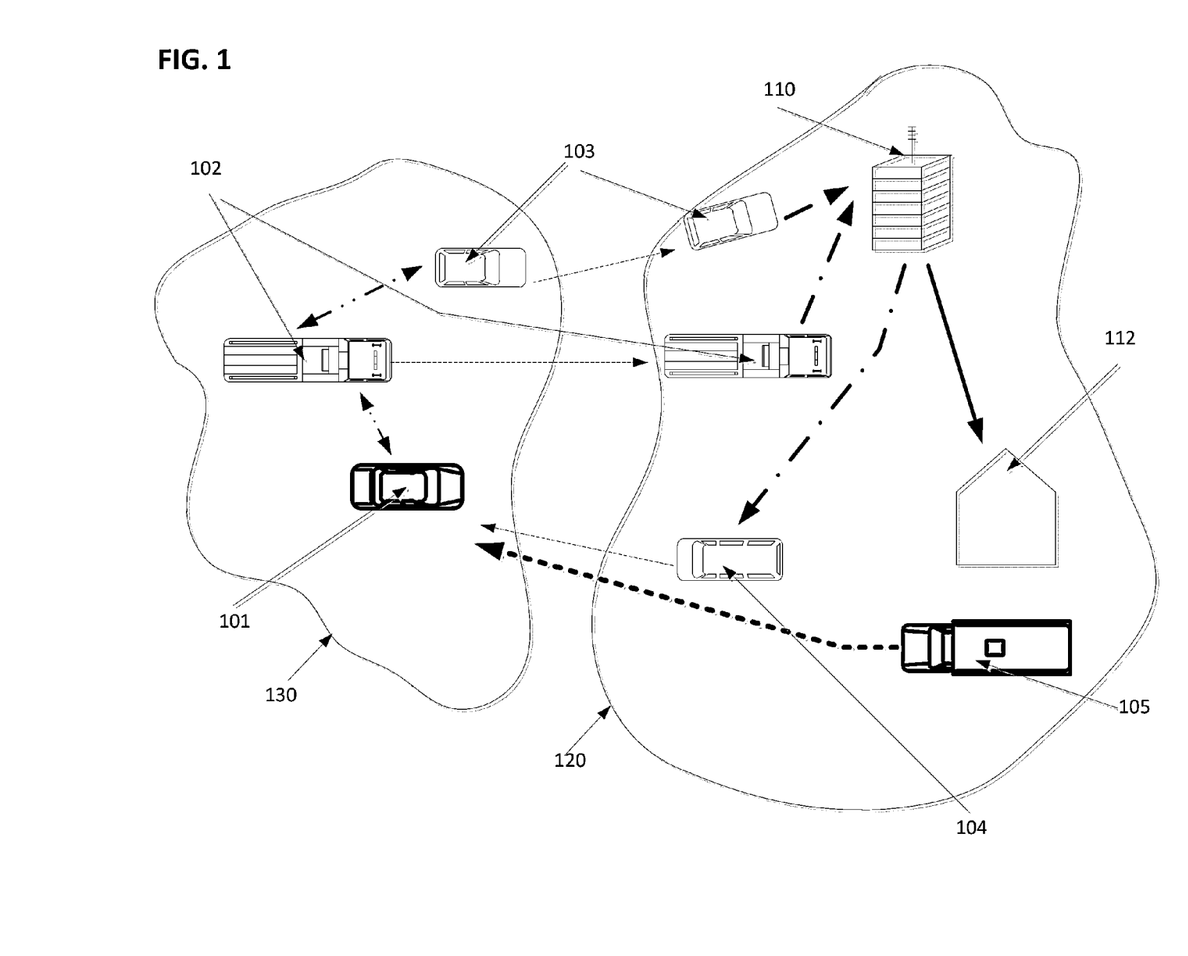
FIG. 1 illustrates an overview of the communication routes performed in an embodiment of the present invention pertaining to emergency communications used in a vehicle having an emergency event outside the mobile phone service areas.

FIG. 1 illustrates an overview of the communication routes performed in an embodiment of the emergency communications used in a first vehicle 101 having an emergency event at the outside of a mobile phone service area 120 of the present invention.

An emergency communication device in the first vehicle 101 involving the emergency event attempts to send an emergency communication message to an intended recipient, such as service authority 110, or a call center located in the mobile phone service area 120 to obtain assistance for the emergency event in this embodiment.

The emergency information from the emergency communication device in the first vehicle when the first vehicle is located in the mobile phone service area can be transferred via the mobile networks to the service authority 110 or the recipient of the emergency information by a mobile phone in the first vehicle. However, the location of the first vehicle involving the emergency event is not necessary to be located in the mobile service area 120. The emergency communication device installed in the first vehicle 101 involving the emergency event determines whether or not the first vehicle 101 is located at the outside of the mobile phone service area 120.

When the emergency communication device in the first vehicle 101 determines the lack of coverage of the mobile phone service area 120, the emergency communication device determines whether any vehicles are likely to be within a communicating range 130 of the emergency communication device installed in the first vehicle 101 involving the emergency event.

If vehicles are determined to be likely within the communication range 130 of the emergency communication device, the emergency communicating device in the first vehicle 101 transmits an emergency communication message for an intended recipient toward a second communication device of a second vehicle 102" via Wi-Fi®, or Wi-Fi Direct® or the like which belongs to a broad-band communication medium. With respect to the definition of the broad-band communication medium will be described later in this specification.

In some embodiments, the intended recipient may include the service authority 110 accessible via the mobile phone when the second vehicle 102 enters into the mobile phone service area 120.

The second emergency communication device retransmits the emergency communication message within the communication range 130 and the message is also received by a third emergency communication device of a third vehicle 103 in the communication range 130. In this case the communication range 130 means not only the communication range measured from the location of the first vehicle 101 but also the communication range measured from the location of the second vehicle 102 or any vehicle having the emergency communication device therein.

When one of the second communication device and the third communication device moves into the mobile phone service area 120, one of the second emergency communication device and the third communication device retransmits the emergency communication message to the intended recipient, or the service authority 110 via the mobile phone.

Further, the second communication device and/or the third communication device may retransmit the emergency communication message to other communication devices with his or her ID (Identification) including a VIN (Vehicle Indemnification Number and/or plate number of the first vehicle involving the emergency event. As a result, one of the emergency communication device having the emergency communication message may retransmits the emergency message with ID(s) who has been involving the uploading the emergency communication messages to the service authority 110 via the mobile phone or via any other media.

By spreading the emergency communication message over other possible emergency communication devices by the retransmission, the emergency communication messages may be able to be efficiently delivered to the service authority 110. By adding the ID(s) involving the transmitting emergency communication messages, which will be uploaded to the service authority, it becomes possible to trace back the communication route when it is necessary.

The second emergency communication device also may respond to the first emergency communication device in the first vehicle 101 involving the emergency event by sending acknowledgement right after having received the emergency communication message while staying in communication range 130 so that the driver of the first vehicle can feel relieved by receiving the acknowledgement.

In response to receiving the emergency communication message, the service authority 110 dispatches a service vehicle 105 by giving instruction to a dispatcher 112 for dispatching the service vehicle 105 based on the received emergency communication message transmitted from the emergency communication device in the vehicle having emergency event in order to assist the vehicle from which the emergency communication message has been transmitted.

The service authority 110 located in the mobile phone service area 120 also selects and determines one or more vehicles 104 within the mobile phone service area 120 that are traveling in the direction toward the first vehicle 101. The current position of vehicles moving toward the first vehicle 101 can be uploaded to service authority 110 by transmitting the positioning data periodically up to the service authority 110 from the vehicles using the functions of a vehicle navigation system and an emergency communication device in each vehicle.

The service authority 110, then, transmits a third message that emergency message originated from the vehicle 101 has been received by the service authority 110 to the emergency communication device of the first vehicle 101 and to respective the emergency communication device of the vehicles 104.

When the vehicle having received the third messages from the service authority 110 may retransmit the third messages over other vehicles around so that one of them may be able to transmit the third message to the vehicle 101 involving the emergency event.

Based on this communication process, unnecessary repetition of transmission of emergency message will be stopped.

The third message is a response message to be sent to the emergency communication device in the first vehicle 101.

When one or more vehicles 104 later moves in an area in a vicinity of the emergency communication device of the first vehicle 101, the respective emergency communication device of one or more vehicles 104 transmits the third message in the communication range 130. The emergency communication device of the first vehicle 101 receives the message via the broad-band communication medium from the vehicle 104 and displays information included in the received second message to a user of the first vehicle 101.

The emergency communication message may include request for assistance for emergency event, name(s) of the person, driver's license number, vehicle ID number (VIN), plate number, insurance policy number, the location thereof, such as GPS information and the time of occurrence of the emergency event. The second and/or third message may include information including a command for the emergency communication device of the first vehicle to stop sending the message, an expected arrival time of a rescue team, a closest waiting place, and/or other information.

In this embodiment, the broad-band communication medium means ZigBee® (ZigBee is a trademark registered by ZigBee Alliance), Wi-Fi® (Wi-Fi is a trademark registered by Wi-Fi alliance), and Wi-Fi Direct® (Wi-Fi Direct is a trademark of Wi-Fi Direct) defined by IEEE 802.15.4 and IEEE 802.11 respectively. However, the communication medium is not limited ZigBee®, Wi-Fi® and Wi-Fi Direct®. For example, the communication media includes a wired telephone system, citizen-band transceivers and ham radio transceivers and the like.

Communication Route

In this embodiment, the communication between the first, the second and the third vehicles 101, 102 and 103 is established via a broad-band communication medium having communication distance (communication range) 130 using ZigBee® defined by IEEE 802.15.4 or Wi-Fi Direct® defined by IEEE 802.11 respectively. As shown in Table 1, the communication range of ZigBee® or Wi-Fi Direct® is relatively short distance, for example, about 400 m~1,700 m in the case of ZigBee®, and about 200 m in the case of Wi-Fi Direct® comparing with that of mobile phone service area. However, the communication medium is not limited ZigBee®, Wi-Fi® and Wi-Fi Direct®. For example, the communication media includes a wired telephone system, citizen-band transceivers and ham radio transceivers and the like.

The communication between the second vehicle 102 and/or the third vehicle 103 and service authority 110 may be performed via mobile communication medium when the second vehicles 102 and the third vehicle 103 move into the mobile phone service area 120 as shown in FIG. 1. In this case the emergency communication messages from the emergency communication device in the second vehicle 102 and/or the third vehicle 103 are transmitted via mobile phone in the second vehicles 102 and/or the third vehicle 103 using a tethering function of the mobile phone in the second vehicles 102 and/or the third vehicle 103 when the second vehicles 102 and/or the third vehicle 103 has entered in the mobile phone service area 120. In other words, the emergency communication device installed in second vehicle 102 or the third vehicle 103 transmits the emergency communication message via a mobile communication network when second vehicle 102 and/or the third vehicle 103 is located in the mobile phone service area 120.

In this embodiment, ZigBee® or Wi-Fi Direct® is used for the communications between the first vehicles 101, the second vehicle 102 and the third vehicle 103 while they are located at outside of the mobile phone service area 120. The communications between the emergency communication device in the second vehicle 102 and the emergency communication device in the third vehicle 103 and a mobile phone therein are performed using Bluetooth when they have moved within the mobile phone service area 120. The reason for this is as following.

Inventor believes that in order to maximize the communication chance between the first vehicle 101 and the second vehicle 102 and/or the third vehicle 103 passing through a relatively short communication range 130 of the emergency communication device of the vehicles, it is important to let ZigBee® or Wi-Fi Direct® to dedicate to the task for establishing the emergency communication between the first vehicle 101 involving emergency event and the second vehicle 102 and/or the third vehicle 103 by providing Bluetooth for communication channels between the emergency communication device and the mobile phone in the second vehicle 102 and/or the third vehicle 103.

Vehicles available in a market place in recent years installs, so called, a hand free telephone (HFT) therein. When people having a mobile phone including a Bluetooth function enters inside the vehicle, the Bluetooth is automatically linked to HFT so that the hands free communication automatically becomes available. One of features of Wi-Fi Direct® is that a Wi-Fi Direct® module can be a hab of communication network. Accordingly, the emergency communication device having a Wi-Fi Direct® function therein can be a hab of the communication networks (forming a hot spot). Thus, for example, the mobile phone having no Wi-Fi Direct® module therein can be linked to the communication network formed by Wi-Fi Direct® hab via Bluetooth. Namely, in recent vehicles having a HFT therein, the Bluetooth of the mobile phone can concentrate on communication with the HFT (Hand Free Telephone) and the hot spot formed by the Wi-Fi Direct® can concentrate on the communication link between the mobile phoned and the emergency communication devices.

Narrowband/Broadband

In this embodiment, the communications between the first vehicle 101 and the second vehicle 102 passing through the vicinity of the first vehicle 101 involving the emergency event is performed using Wi-Fi Direct® having a communication rate of 250 Mbps or ZigBee® having a transmission rate 250 Kbps, which belongs to a broad-band communication according to the definition of FCC.

According FCC definition regarding the communication bandwidth, the broadband data rate varies significantly depending on the particular type and level of service ordered and may range from as low as 200 kilobits per second (kbps), or 200,000 bits per second, to 30 megabits per second (Mbps), or 30,000,000 bits per second. Some recent offerings even include 50 to 100 Mbps. Alternatively, according to FCC definition of narrow banding, the data operations on channels greater than 12.5 KHz must employ data rates greater than 4.8 kbps per 6.25 kHz channel, such as 19.2 kbps per 25 kHz channel. According to FCC definitions, the communications held between the first, second and third vehicles using ZigBee® or Wi-Fi Direct® belong to broad-band communication medium.

Table 1 shows the comparison between ZigBee®, Wi-Fi Direct® and Bluetooth® (Bluetooth is a registered trademark of Bluetooth Sig, Inc., a Delaware Corporation).

TABLE 1

|  | IEEE 802.15.4 ZigBee ® | IEEE 802.00 Wi-Fi Direct ® | IEEE 802.15.1 Bluetooth ® 3.o | IEEE 802.15.1 Bluetooth ® 2.0 |
| --- | --- | --- | --- | --- |
| Communication Distance Range | About 400~1.7 Km | About 200 m | About 100 m | About 10 m |
| Signal Transmission Rate | About 250 kbps | About 250 Mbps | About 25 Mbps | About 3 Mbps |
| Link Setup Time | NA | 2~3 sec | Several tens sec | Several tens sec |
| Upward Compatibility | NO | YES | NO | — |
| Max. Number of Connections | 65,535 | 32 | 7 | 7 |
| Cost | NA | Acceptable | Acceptable | Low |
| Remarks | Mesh networking, which puts priority to communicate each other at any time in the communication distance range. | Putting the priority to communication speed. |  |  |

Figure 2:
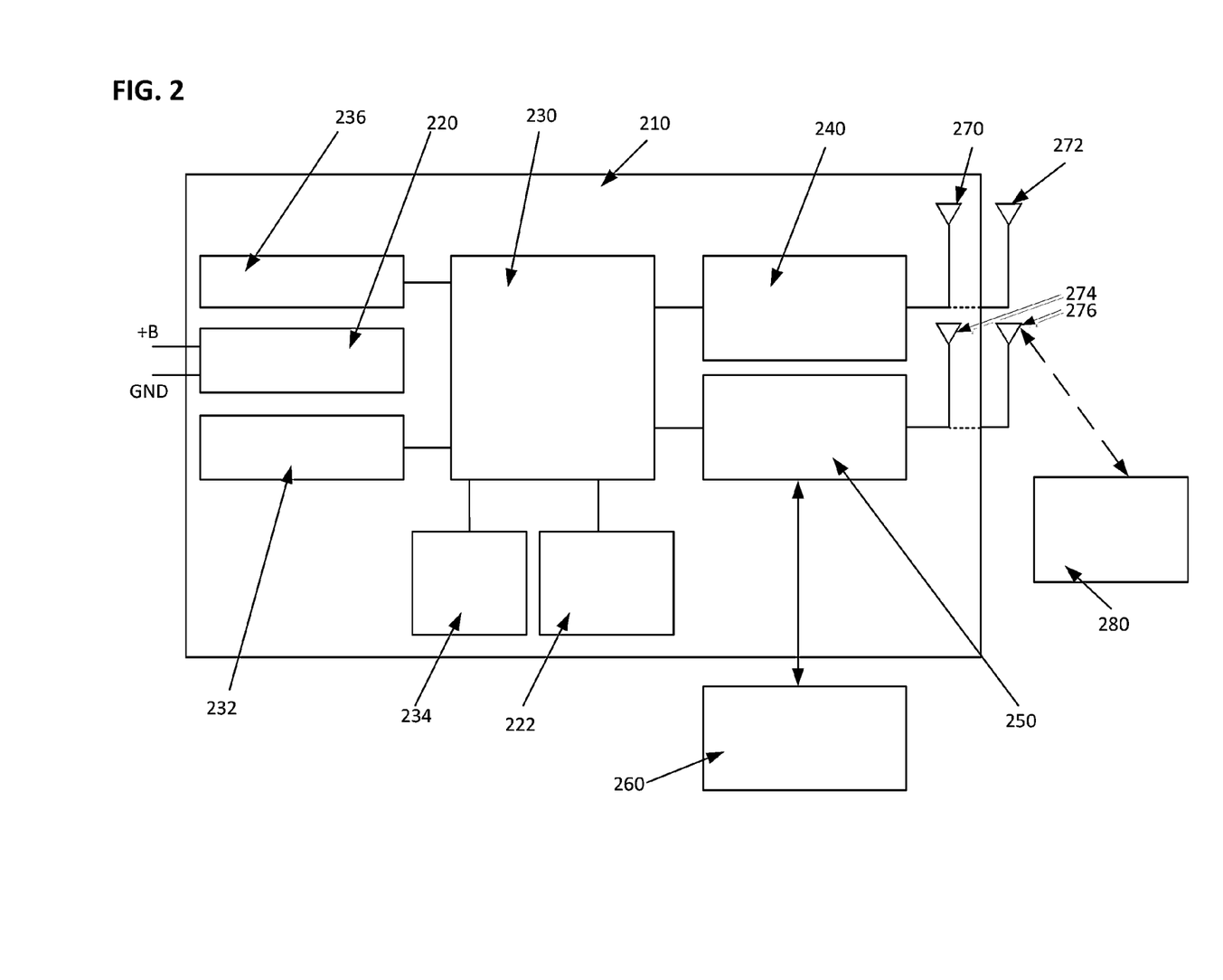
FIG. 2 illustrates a block diagram of an embodiment of an emergency communication device of the present invention.

FIG. 2 illustrates a block diagram of an embodiment of an emergency communication device 210 of the present invention. The emergency communication device 210 includes a microcomputer 230 for executing computer programs stored in the memory 232 which controls functions of the emergency communication device 210. The emergency communication device 210 also includes GPS (Global Positioning System) 240 for proving positioning information of the vehicle, such as, Latitude, Longitude and time information when measuring the location. The GPS 240 is controlled by the computer program running on the microcomputer 230.

Further, the emergency communication device 210 includes a communication module 250 including Wi-Fi Direct® module and Bluetooth® as communication devices. Each of GPS 240 and the communication module 250 has embedded antenna 270 (274). Outside antennas 272 (276) may be optionally added to each of GPS 240 and the communication module 250. The embedded antenna 274 of the communication module is used to send and receive information to/from other emergency communication device 280.

The emergency communication device 210 may also include Micro SD 234 for debugging purpose and a rechargeable battery 222 to be used to keep stored data in the memory 232 when a power supply 220 is turned off. Further, another role of the rechargeable battery 222 is to be used by the emergency communication device 210 when the emergency communication device 210 is carried out from the vehicle by the driver or the passengers who is trying to be away from the emergency vehicle to avoid the dangerous situations associated with the emergency vehicle. In this situation, this battery is used instead of the power supplied via car battery of the emergency vehicle.

The emergency communication device 210 also has an indicator 236, such as, LED (Light Emitting Diode) for display the status of the operations of the emergency communication device 210. The indicator 236 may be replaced by the display device, for example, LCD (Liquid Crystal Display) or the like for displaying information associated with the operations of the emergency communication device 210. Also the emergency communication device 210 may include a sound output device, such as a speaker (not shown) for outputting beep sound when an operational mode or status changes to notify the change of mode and/or status of operation to a driver and/or passengers.

A mobile communication device 260, such as a mobile phone or a smart phone or the like, for example is arranged to communicate with the emergency communication device 210 via, Wi-Fi® or the like, such as Bluetooth®, for example. In other words, the mobile communication device 260 functions as an input device or an output device to the emergency communication device 210. The camera (not shown) installed in the mobile communication device 260 may be used to obtain VIN and/or plate number of the vehicle, then each character of VIN and or plate number of the vehicle may be optically read and transmitted to the target equipment.

The functions of smart phone applications of the mobile communication device 260 are as follows.

To send emergency information to the emergency communication device in a vehicle passing near the emergency vehicle via the emergency communication device in the emergency vehicle when the emergency vehicle is located outside the service area and/or send the emergency information to a service authority when the vehicle is located within the mobile communication service area.

To register this service contract information (policy number), address, birthday, home doctor or similar information and insurance company information of the driver, names who should be notified when emergency event happens and his/her contact information, VIN (Vehicle Identification Number) of the vehicle or any other personal information may be transmitted to the emergency communication device via Wi-Fi Direct® or Bluetooth®, for example.

To capture VIN by a smart phone camera.

To capture the face of the driver, passenger(s), or car owner by a smart phone camera.

To recognize the MAC Address of Bluetooth or the like of a newly bought car to which the smart phone is linked when the previous car is replaced with the newly bought car to notify the owner of the car that the previous MAC address needs to be updated and new VIN is to be registered.

To obtain the characteristics of the power supply, for example, the program is arranged to check the voltage level of the DC voltage of the battery of the car and/or, the ripple voltage wave on the DC voltage wave form of the DC voltage supplied from the battery of the car to which the emergency communication device is installed to detect that the communication device is installed to a different car from a previous car. By using this function of the computer program, the driver can be notified that a new VIN registration is necessary.

Those items listed above are important information to be used when an emergency event occurs. Also, the camera included in the mobile phone is used to obtain VIN of the vehicle by using the optical recognition technique so that it is not necessary to manually input lengthy VIN of the vehicle. The VIN may be transferred to the emergency communication device 210 via Wi-Fi Direct® module from the smart phone or the mobile communication device 260.

Figure 3:
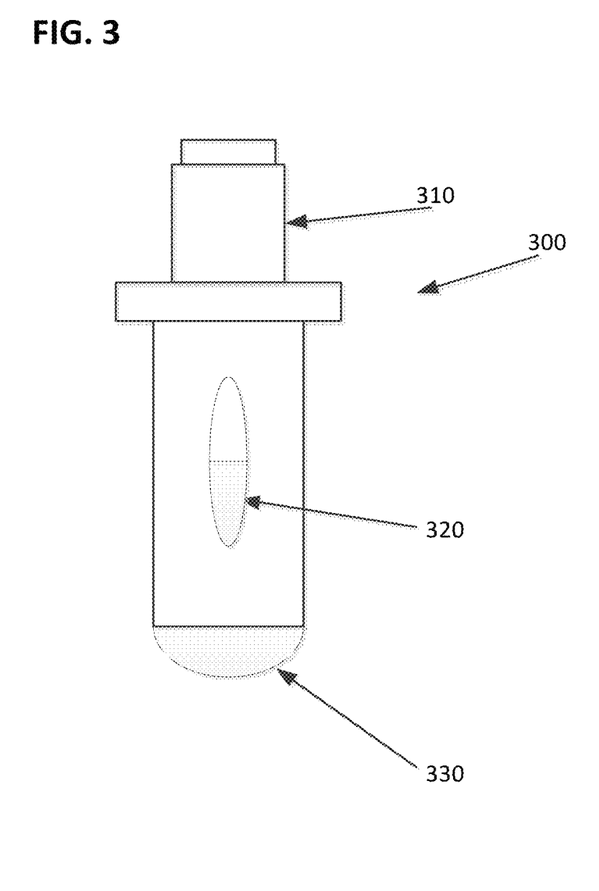
FIG. 3 illustrates an outer view of an emergency communication device of the present invention designed to be used in vehicles.

FIG. 3 illustrates an outer view of an emergency communication device of the present invention. A cigar socket end 310 attached to the body 300 of the emergency communication device is structured to be inserted into a cigar lighter receptacle in the vehicles. There is provided an on-off switch 320 for starting, stopping and cancelling transmission of emergency communication message from the emergency communication device on the surface of the body so that the driver can easily operated the on-off switch 320. The cancelling transmission function is used when the vehicle involving emergency event has already rescued and/or the emergency communication message has already received by the service authority 110, or when he or she who has received the emergency communication messages does not want to use his or her own mobile phone. Also there is provided a color indicator, such as a color LED (Light Emitted Diode) 330 for indicating several statuses of the operations of the emergency communication device based on the signals received via Wi-Fi Direct® module or ZigBee® module.

Normal Emergency Communications

Figure 4:
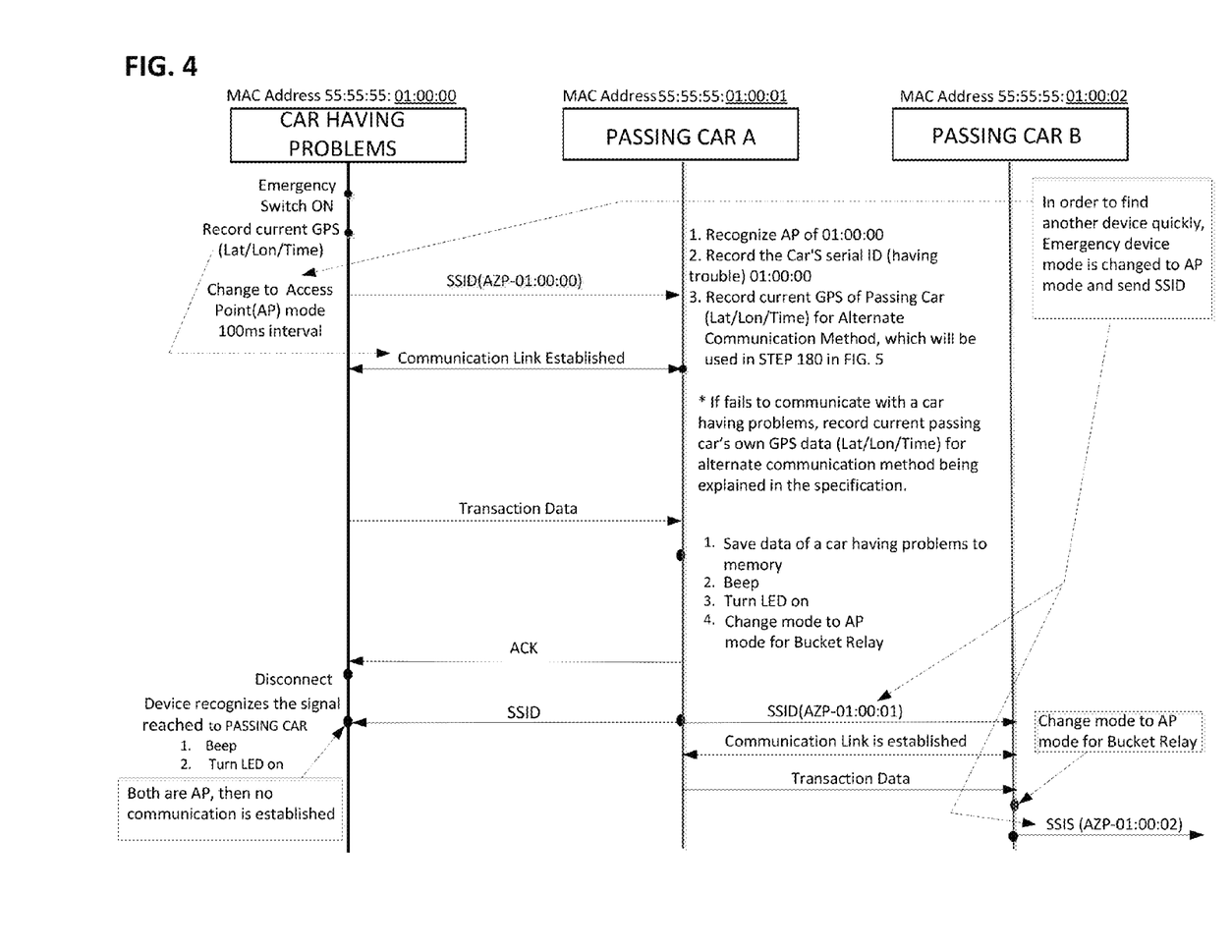
FIG. 4 illustrates a timing chart of communication protocol between an emergency communication device in a vehicle involving an emergency event, a communication device in a second vehicle and a third vehicles passing through the area of communication distance of the emergency communication device.

FIG. 4 illustrates a timing chart of communication protocols between an emergency communication device 210 in a car having problems involving an emergency event (the first vehicle 101), and an emergency communication device 210 in a passing car A (the second vehicle 102) and a passing car B (a third vehicles 103).

When the car having problems encounters a traffic accident or an engine trouble or the like, a driver of the car having problems turns on an emergency switch of the emergency communication device 210 installed in the vehicle.

Then, the emergency communication device 210 in the car having problems records current GPS data supplied from GPS 240 including Latitude, Longitude and GMT (Greenwich Mean Time). In this instance, the operation mode of the emergency communication device 210 is changed to an AP (Access Point) mode from a client mode and transmits SSID (Service Set Identifier) including MAC Address, for example, MAC Address 01:00:00, as shown in FIG. 4.

When a passing car A is passing through an area of the communication distance of the emergency communication device 210 in the car having problems, for example, the distance between the car having problems (the first vehicle 101) and the passing car A (the second vehicle 102) is less than 200 m, for example, the emergency communication device 210 in the passing car A (the second vehicle 102) recognizes AP (Access Point) of 01:00:00 being the emergency communication device 210 in the car having problems (the first vehicle 101) as shown in a timing chart illustrated in FIG. 4.

The emergency communication device 210 in the passing car A (the second vehicle 102) records the 01:00:00 as an Emergency Device. Then the emergency communication device 210 in the passing car A (the second vehicle 102) records current own GPS data (Lat/Lon/Time), which may be used when the emergency communications between the car having problems (the first vehicle 101) and the passing car A (the second vehicle 102) is not fully established. This will be explained later in detail.

When the emergency communication device 210 in the passing car A (the second vehicle 102) receives necessary data including MAC Address of the emergency communication device 210 in the car having problems (the first vehicle 101), the emergency communication device 210 in the passing car A (the second vehicle 102) transmits the signal showing that the communication link is established to the emergency communication device 210 of the car having problems (the first vehicle 101).

Then, the emergency communication device 210 in the car having problems (the first vehicle 101) sends transaction data having format: [EMG, EMG Serial ID, Failure Flag, Latitude, Longitude, GMT, Direction and Delta V] to the emergency communication device 210 in the passing car A (the second vehicle 102).

Followings are definition of each item in the data format.

EMG or PAS: To show the information source between Car having problems or Passing Car EMG Serial ID: Low order three Octets of MAC Address, or serial number of device Failure Flag: 0: (Success), 1: (Failure)

Latitude: ±xxx.xxxxxx

Longitude: ±xxx.xxxxxx

GMT: ISO Standard (YYYY-MM-DD THH: MM:SS-NN: NN) . . . . The time when the device is activated, or when the emergency information is received Direction: 8 Directions (N, E, S, W, NE, SE, SW, NW) . . . Emergency Device always records own location every 100 m (Longer than GPS accuracy) and determines the direction. The number of directions in not limited to 8 but may be 4 or 16 or other numbers. The own location record distance is not limited to every 100 m. It may be every 50 m or every 200 m, for example.

Delta V: −xxx.x [km/s] . . . . It is recorded by conducting the GPS's Doppler measurement. The biggest number in the previous 30 seconds after the Emergency Device is activated is recorded. The GPS's Doppler measurement performed by GPS in the emergency device is not limited to be record previous 30 seconds but it may be previous 15 seconds or previous 60 second or any other numbers.

A smart phone application program can also detect the movement of the driver or the passenger having the smart phone in the car having problems by using a smart phone's internal gyro sensor or an acceleration sensor etc. and the application can record whether the driver is alive if the smart phone can detect the movement after 60 seconds from the time of Emergency Device activation. In this situation, the time duration for detecting the movement by using smart phone's gyro sensor is not limited to 60. It may be 30 seconds or 2 minutes or may be 3 minutes. In other words, when some movement can be detected for a predetermined time period after the accident or emergency event is reported, this means that the driver or passenger having the smart phone seems to be alive. If no movement is detected with the gyro of the smart phone, the driver or the passenger of the car having problems might face to a fatal situation.

Following is an example of the transaction data.

[EMG, 01:00:00, 0, 033.836063, −118.30968, 2013-11-02T11:24:36-07:00, NW, −045.0]

The transaction data format used in the emergency communication device 210 in the vehicles associated with the emergency communication will be shown below.

Emergency communication device 210 in the car having problems (Emergency Device), to an emergency communication device 210 in the passing vehicle 102 (Passing Device): [EMG, EMG Serial ID, Failure Flag, Latitude, Longitude, GMT, Direction and Delta V]

Passing Device A to Passing Device B: [PAS, EMG Serial ID, Failure Flag, Latitude, Longitude, GMT, OWN Serial ID]

Passing Device B to Passing Device C: [PAS, EMG Serial ID, Failure Flag, Latitude, Longitude, GMT, OWN Serial ID]

In this embodiment, information of the car having problems on Passing Cars is arranged to be expired when the data has been sent to a server of the service authority 110 via Smart Phone, in 3 days after the emergency information received, or manually removed by customer, but not limited to this example.

Back to the explanation of FIG. 4, the emergency communication device 210 in the passing car A (the second vehicle 102) saves the information pertaining to the car having problems (the first vehicle 101) read from the transaction data into the memory 232 when the transaction data is received by the passenger car A (the second vehicle 102). Then, the emergency communication device 210 in the passing car A (the second vehicle 102) outputs beep sound and/or turns LED 330 on to notify the driver of the passing car A (the second vehicle 102) that an emergency message has been successfully received.

Then, the emergency communication device 210 in the passing car A (the second vehicle 102) changes the client mode to AP (Access Point) mode.

When the emergency communication device 210 in the passing car A (the second vehicle 102) recognizes that passing car B (the third vehicle 103) is passing through the communication area, the same procedure continues to send transaction data to the emergency communication device 210 in the passing car B (the third vehicle 103) as shown in FIG. 4.

When one of the cars having the emergency message enters into the mobile phone service area 120, the emergency message is sent via a mobile phone to the service authority 110. Then the service vehicle 105 is dispatched to the point where the emergency information teaches.

Process when Communication is not Established

Returning to FIG. 4 again. Assume that the emergency communication device 210 in the passing car A (the second vehicle 102) has recognized SSID sent from the emergency communication device 210 in the car having problems (the first vehicle 101) once, but the emergency communication device 210 has failed receiving the SSID continuously in the subsequent communication steps due to the passage of the communication distance, and/or due to incoming noise signals received by the emergency communication device 210 in the passing car A (the second vehicle 102). And in this situation, the emergency communication device 210 is assumed failing to receive GPS location information of the car having problems ((the first vehicle 101). Then, the emergency communication device 210 in the passing car A (the second vehicle 102) sets a Failure Flag on in the transaction data format. Then the emergency communication device 210 in the passing car A (the second vehicle 102) sends own GPS location (Latitude, Longitude and GMT) instead of the GPS information (Latitude, Longitude and GMT) of the car having problems (the first vehicle 101) to the emergency communication device 210 in the passing car B (the third vehicle 103) or the service authority 110.

Dispatcher 112 (a rescuer) can search the victim(s), who activated the emergency communication device 210 in the car having problems (the first vehicle 101), based on the location information of the passing car A (the second vehicle 102) passing through the communication distance of the emergency communication device 210 in the car having problems (the first vehicle 101). This Failure Flag means that the GPS location information has been recorded by the emergency communication device 210 in the passing car (the second vehicle 102) based on the GPS information of the passing car (the second vehicle 102) and it is not based on the GPS information of the emergency communication device 210 in the car having problems (the first vehicle 101). Then, the dispatcher can search the car having problems within the area based on the communication distance of the emergency device.

SSID (Service Set Identifier) Including Position Information

When Wi-Fi® technology is applied to the emergency communication devices on the vehicles driving on the road, due to the limited communication distance being several hundred meters, it is important to obtain the location information as soon as the emergency communication is established. Following is an embodiment of the present invention to send necessary emergency information as a part of SSID (Service Set Identifier) so that the necessary emergency information is transmitted to an emergency communication device in the passing car as soon as the emergency communication device in the car having problems is activated.

One of examples of SSID Format has 32 characters in size, for example, "AZP-xx:xx:xxx where xx:xx:xxx means low order three Octets of MAC Address.

The necessary information of the emergency communication device will be as following, which is transmitted as SSID to the emergency communication devices in passing car(s).

EMG or PAS: To show the information source between Car having problems and Passing Car EMG Serial ID: Low order three Octets Failure Flag: 0(Success), 1(Failure)

Latitude: xxx.xxxxxx

Longitude xxx.xxxxx

GMT: ISO Standard (YYYY-MM-DDTHH:MM:SS-NN:NN)

Direction: 8 Directions (N, E, S, W, NE, SE, SW, NW)

Delta V: −xxx.x [km/s]

In order to avoid unexpected abuse usage, such as hacking, the data can be encrypted and/or SSID can be hidden by Stealth Mode of Wi-Fi® technology.

Example of Operation of Emergency Communication Device

Figure 5:
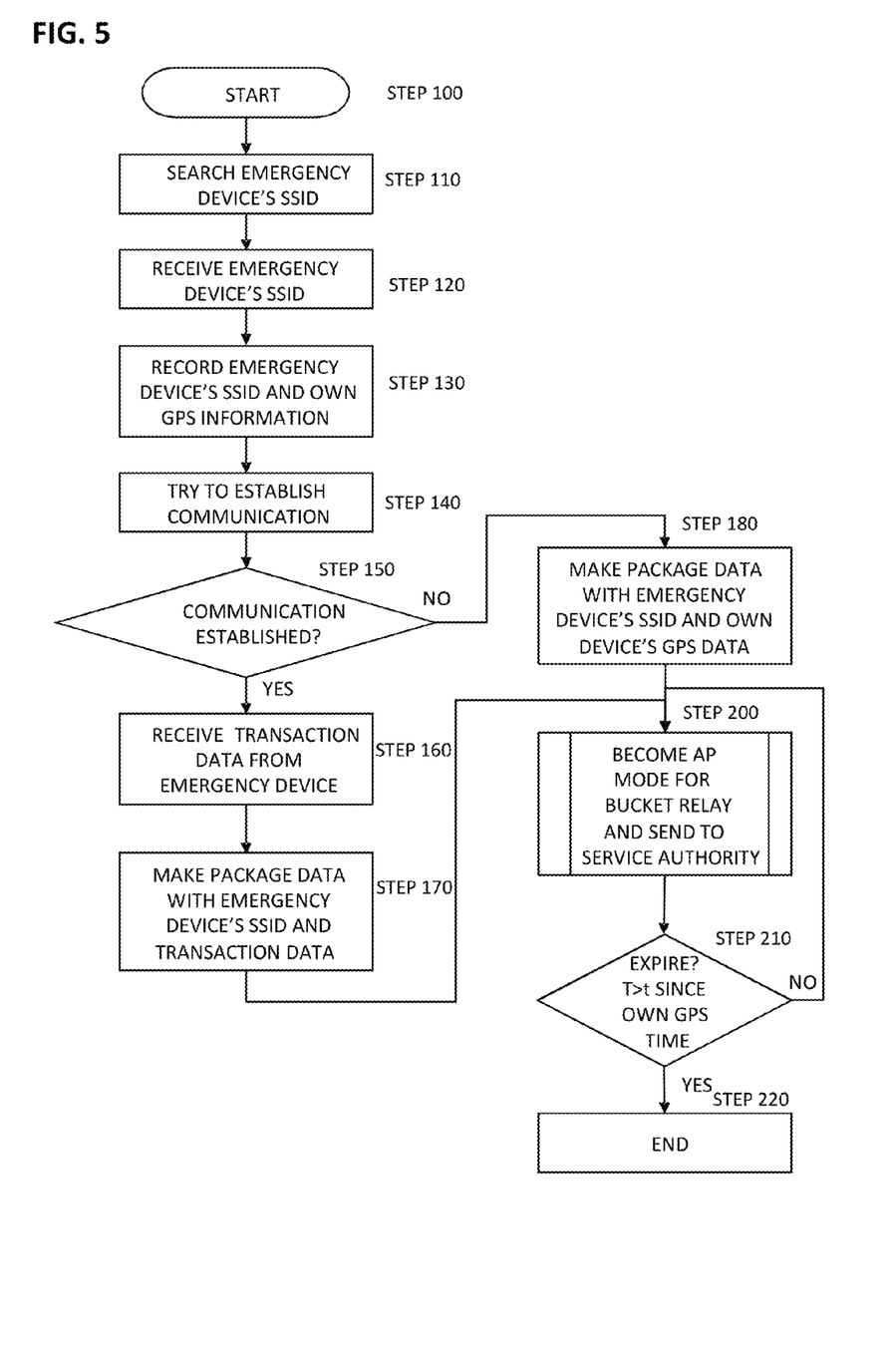
FIG. 5 illustrates a flow chart showing one of examples of the operation flow of the computer program running on the microcomputer 230 illustrated in FIG. 2.

FIG. 5 illustrates a flow chart showing one of embodiments of an operation flow of the computer program running on the microcomputer 230 illustrated in FIG. 2. When the power of the emergency communication device 210 is supplied, the computer program stored on the memory flash 232 starts. [STEP 100]

When program running on the microcomputer 230 in the passing car (the second vehicle 102) starts as shown at STEP 100, the computer program starts watching whether any emergency device's SSID has been received as shown in the flow chart. [STEP 110] When a vehicle having an emergency communication device 210 therein happens to pass through an area within a communication distance of an emergency communication device 210 installed in a car having problems (the first vehicle 101), (hereinafter it may be called an emergency device), the computer program of the emergency communication device 210 in the passing car (the second vehicle 102) (herein after it may be called a passing device), receives SSID (Service Set Identifier) including MAC address of the emergency device 210. [STEP 120].

Then, the computer program of the passing device records the emergency device's SSID and own GPS information into the memory 232. [STEP 130] Then the passing device tries to establish the communication link with the emergency device as shown in the time chart shown in FIG. 3. [STEP 140]

In this instance, several possible situations may occur with respect the operations of the microcomputer of the passing device. For example, when the speed of the passing car is assumed 60 Miles/hour (96.5 Kilometers/hour), and the communication distance of the emergency communication device 210 is assumed to be 200 meters corresponding to the circle having the diameter of 400 meters centering on the point where the car having troubles (the first vehicle 101) is located. From these assumptions, it is calculated that the passing car (the second vehicle 102) must complete necessary communication steps within about 15.1 seconds in theory.

Then, following situations may happen when the passing device receives emergency information from the emergency device: 1) SSID from the emergency device has been successfully recognized once. However, due to the weak signal level, a subsequent communication process cannot be performed correctly. 2) The predetermined time period has been passed before establishing the communication. 3) The signal strength from the emergency device becomes lower than the predetermined level. 4) NACK (Non Acknowledgement) signal has been returned from the emergency device even though SSID has been correctly received by the passing derive and sent the necessary information to the emergency device. Thus, the computer program checks whether the communications between the emergency device and the passing device have been established by checking the items listed above. [STEP 150]

When the communication between the emergency device and the passing device has been established, the computer program in the passing car successfully recognize the transaction data including necessary information of the car having problems from the emergency device as described previously in this specification (normal communication). In this instance, the emergency device outputs beep sound from the emergency device and/or turns on LED so that the driver knows that emergency communication has been established between the emergency device and a passing device. The beep sound is outputted and/or LED is turned on, (not shown in the flow chart). [STEP 160]

Then, the computer program moves to STEP 170 where the computer program of the passing device forms package data including the emergency device's SSID and the transaction data received at STEP 160 and transmit the package data. [STEP 170]

When the emergency communication has not been established due to any one of reasons described above, the computer program of the passing device forms the package inducing emergency device's SSID and the own GPS data included in the passing device as shown in STEP 180.

In this case, when the emergency communication has not been received correctly but when at least the passing device has recognized that SSID has been received once but subsequent communication is not be maintained, then the failure flag discussed previously is set in the package data so that the package data can notify the service authority that an emergency event has been occurred in the area within the communication distance of the GPS data of the passing car. [STEP 180]

Then, the process moves to STEP 200. In this STEP 200, the computer program of the passing device sets, the client mode, as explained in STEP 110, to the AP (Access Point) mode where the package data including emergency information and the location data are transmitted to service authority in some cases by the backet replay method. [STEP 200]

The information of the car having problems stored in the passing device is arranged to be expired when the data has been sent to server of the service authority 110 via a mobile phone or a smart phone when the passing car has entered into the mobile phone service area. In another embodiment, the information of the car having problems may be arranged to be expired when a predetermined time has been elapsed, for example, 72 hours or three days after having received the emergency information, or when manually removed from the memory of the passing device.

According to an embodiment of the present invention, since the client mode of the passing device is set to AP mode when transmitting the package data including the emergency information including GPS data, the beep sound is outputted and/or the LED is turned on to notify the driver of the mode change. The emergency device having the AP mode and the passing device having AP mode cannot communicate each other because both of the emergency communication device have been set to the same mode being the AP mode. As a result, unnecessary communication will not be established.

By using the failure flag function described above, since the service authority can obtain the information of the area (it is not pin point information) where the emergency event has occurred even though when the emergency communication is not successfully completed, for example, when the passing device has reached at a critical point, such as the border of the communication distance.

By providing a failure flag field and a data field including GPS data of the emergency device and/or that of passing device in the data format of the SSID, it becomes possible to establish the emergency communication at a very initial point of the emergency communication. As a result, more efficient and high-speed communication is established by applying an aspect of the present invention to the communication system. An aspect of the present invention applied to the emergency communication used in the out of service area of the mobile phone service has been described above. However, this feature can be utilized in telecommunication systems which require the height speed communication establishment.

Receiving Signal Strength from Moving Vehicles

Figure 6:
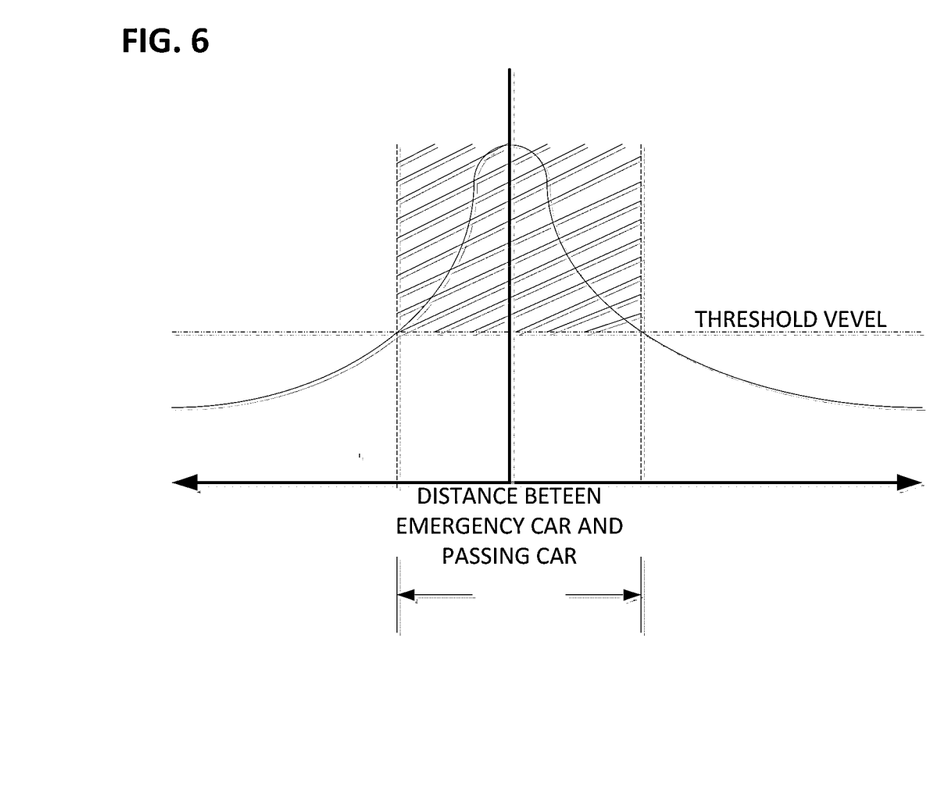
FIG. 6 illustrates the changes of the emergency communication signal strength transmitted from a vehicle passing through a vicinity of the vehicle involving an emergency event, the signal strength being measured at the point where the vehicle involving the emergency event is located.

FIG. 6 illustrates the changes of the signal strength transmitted from the second vehicle (a passing car "A") or third vehicle (a passing car "B") to the first vehicle 101 (a car having problems) involving an emergency event. In this embodiment, the signal strength is measured at the point of the first vehicle 101 (the car having problems) involving the emergency event. The signal strength to be received at the first vehicle 101 (the car having problems) transmitted from the second or third vehicle 102 or 103 (the passing car "A" or "B") which is moving relative to the point where first vehicle 101 (the car having problems) is located become stronger while the distance between the second or third vehicle 102 or 103 (the passing car "A" or "B") and first vehicle 101 (the car having problems) becomes short and becomes weak when the distance between the second or third vehicle (passing car "A" or "B") and the first vehicle 101 (the car having problems) becomes long. Thus, the microcomputer 230 of the emergency communication device installed in the first vehicle 101 (the car having problems) is arranged to select the second or third vehicle 102 or 103 (the passing car "A" or "B") having the strongest signals among the received signals from the vehicles linking with in order to transmit the emergency communication message and to successfully complete the emergency communications.

When signal strength becomes low, the signal to noise ratio tends to decrease because SNR (Signal to Noise Ratio) is defined by $P_{signal}/P_{noise}$. In order to establish the communication, a certain level of signal strength is required. A threshold level shown in FIG. 6 denotes the minimum level of signal strength to keep the legible communications between two communication parties. As discussed previously, the communication range or communication distance of ZigBee® module or Wi-Fi Direct® module is—longer than that of the of Bluetooth® or the like.

Figure 7:
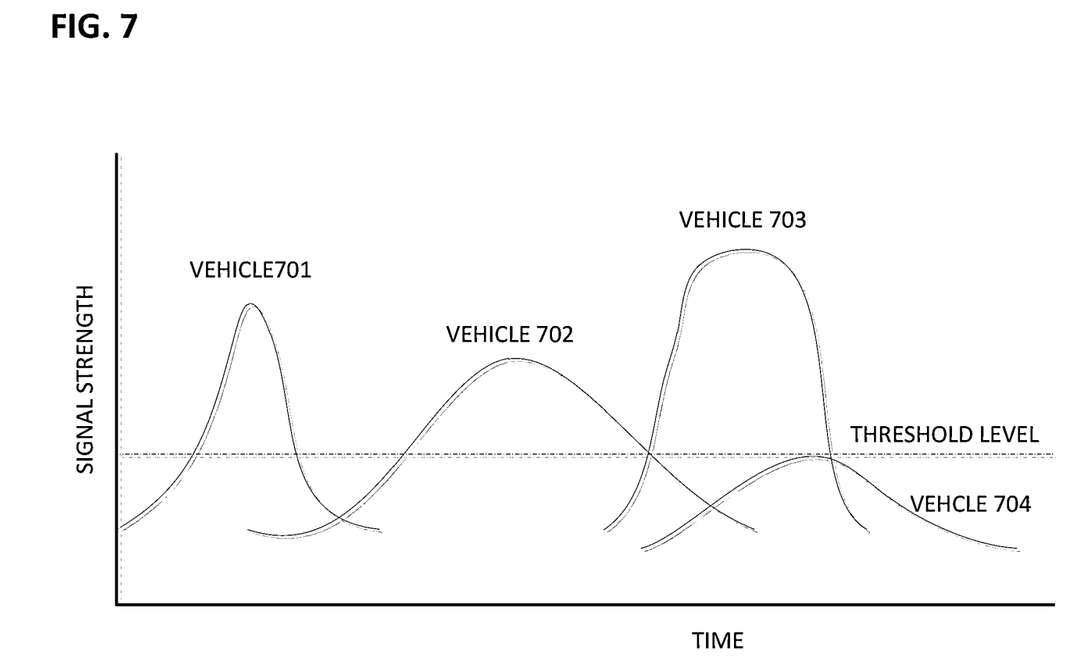
FIG. 7 illustrates the changes of the communication signal strength transmitted from the vehicles approaching to and passing though the vicinity of the vehicle involving the emergency event. The communication signal strength from each vehicles is measured at the point where the vehicle involving the emergency event.

FIG. 7 illustrates the changes of the communication signal strengths transmitted from the vehicles approaching to and passing though the vicinity of the vehicle involving the emergency event. In this embodiment, total four vehicles 701~704 are moving near the vehicle involving the emergency event within a certain time period. The signal strength from vehicle 704 is lower than the threshold level. The communication signal strength from each vehicle is measured at the point where the vehicle involving the emergency event is positioned.

Accordingly, in this embodiment, the candidates to be vehicles to be linked with as counterpart of the emergency communication transmission via broad-band communication media will be vehicles 701~703.

Selecting Signal from Vehicle Having Stronger Signal and/or Driving Slowly

When a plurality of vehicles is approaching to the first vehicle 101 (the car having problems) involving an emergency event, the microcomputer 230 of the emergency communication device 210 is arranged to check the degree of changes of receiving signal strength "Δs" in a certain period time "Δt" (obtaining a differential coefficient of a receiving signal in a small time period) for each receiving signals in order to establish better communication conditions.

Figure 8:
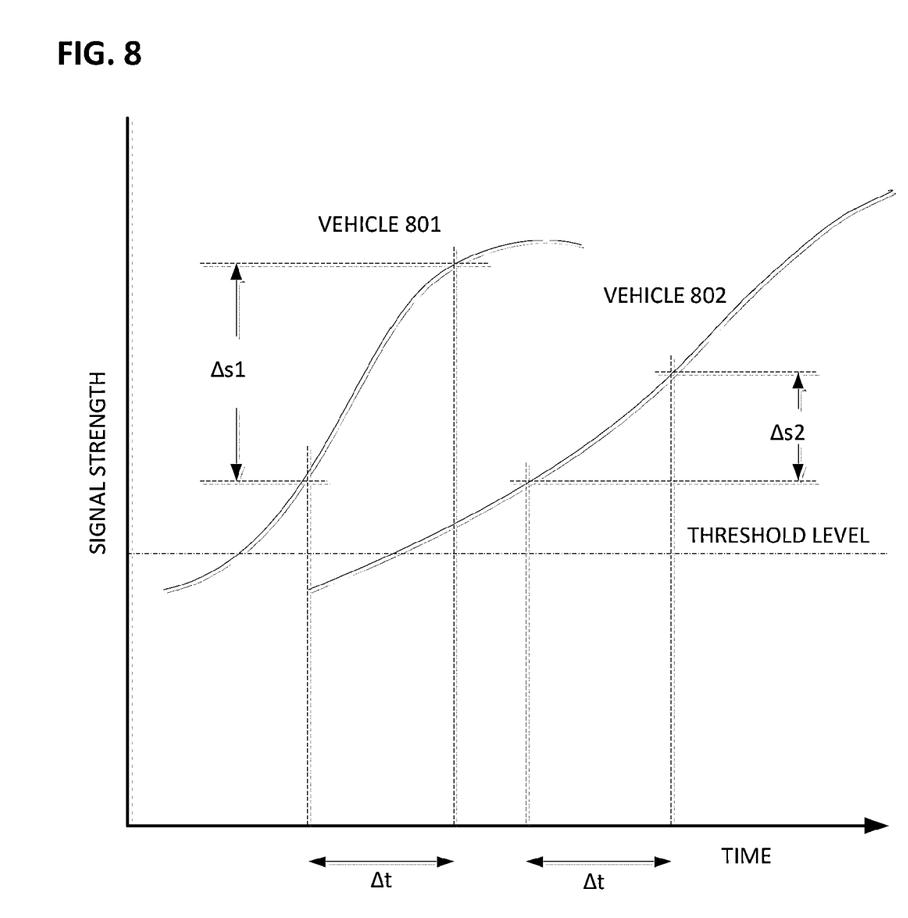
FIG. 8 illustrates an embodiment how the emergency communication device in the vehicle involving the emergency event determines the priority to select the vehicle to be linked to transmit the emergency message.

FIG. 8 illustrates an embodiment how the emergency communication device in the vehicle involving the emergency event determines the priority communication when selecting the vehicle to be linked with to transmit the emergency message. The microcomputer 230 of the emergency communication device 210 selects the vehicle 802 driving at slower speed comparing with another vehicle 801. This selection can be performed by measuring the degree of changes of signal strength of receiving signals from vehicles 801 and 802. By performing this selection of vehicle 802, the emergency communication device is expected to keep longer communication time period so the stable and firm emergency communication can be realized.

The reason why selecting the signals showing the slower signal strength changes in a predetermined time period is that the vehicle transmitting the signals showing slower signal strength changes in a predetermined time period is supposed to move slower speed among the approaching vehicles so that the mutual communication period held between two vehicles becomes longer comparing the signals changing faster rate.

In anther embodiment of the present invention, the microcomputer 230 may select the vehicle showing stronger signal strength in a certain period of time. In this case, since the signal strength is strong, the time duration within which the signal level stays above the threshold level is expected to be longer enough to complete the necessary emergency communications.

Figure 9:
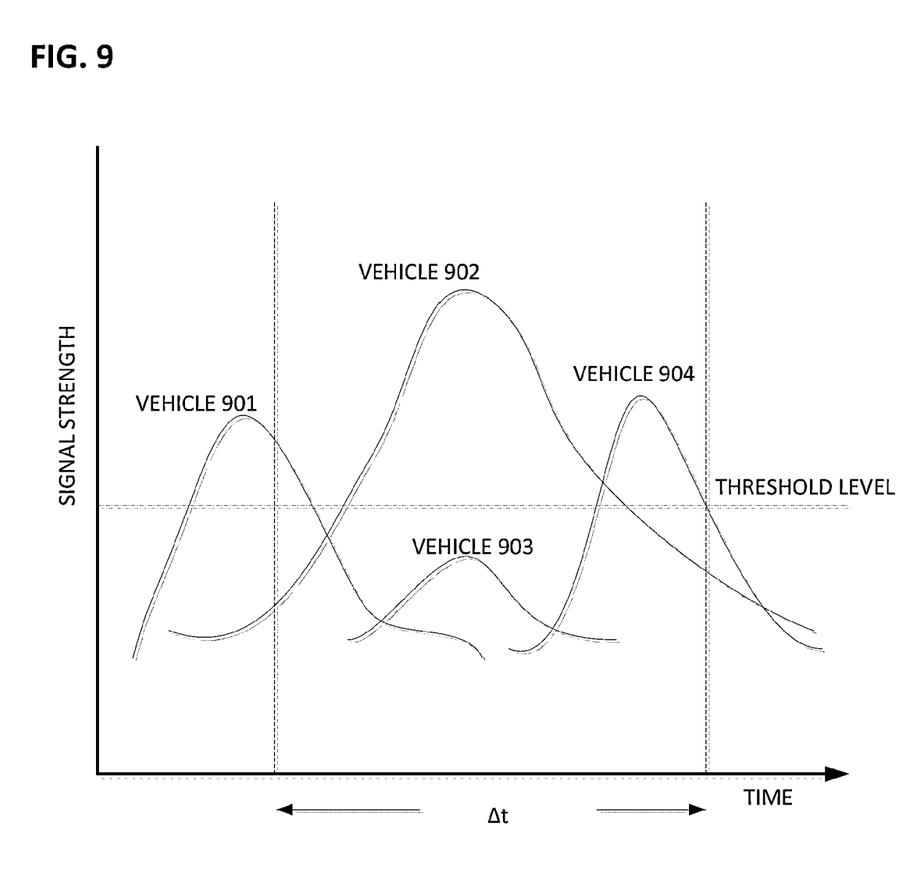
FIG. 9 illustrates another embodiment how the emergency communication device in the vehicle involving the emergency event determines the vehicle to be linked when a plurality of vehicles passing through the vicinity of the emergency communication device in the vehicle involving the emergency event within a predetermined time period ($\Delta t$).

FIG. 9 illustrates another embodiment how the emergency communication device in the vehicle involving the emergency event determines the vehicle to be linked with when a plurality of vehicle passing through the vicinity of the emergency communication device in the vehicle involving the emergency event within a predetermined time period (Δt). As shown in FIG. 9, vehicle 902 shows the strongest signal level among other vehicles within the time period of Δt. Since the aspects of traffic condition changes as time elapses, the microcomputer 230 keeps the process to measure the signal strength and calculate the signal strength degree changes in a certain time period to find out other possible vehicles which passes through the communication distance until receiving the acknowledge signal that the emergency messages has been received by the service authority or at least a vehicle passing through the vicinity of the vehicle involving the emergency event.

Power Saving

The emergency communication device in this embodiment has a function for automatically and/or periodically transmitting emergency signals whether or not there are vehicles passing through the vicinity of the first vehicle 101 involving emergency event. In this case, an amount of power of battery is anticipated to be consumed to transmit the emergency signals from the emergency communication device.

In another embodiment, the communication device is arranged to start transmission of emerging communication signals when the emerging communication vehicle recognizes a vehicle approaching to the vehicle involving emergency event or manually starting transmission of the emergency communication signals by pushing a on/off switch 320 installed in the emergency communication device as illustrated in FIG. 3. This on/off switch 320 is attached to the emergency communication device so that the user can touch in a normal operation of the equipment inside the vehicle.

Acknowledgment of Emergency Communication

While transmitting emergency communication message from the emergency communication device in the first vehicle 101 involving the emergency event, people associated the first vehicle 101 involving emergency event is anxious about whether or not the emergency communication messages have been picked up by someone. In order to reduce the anxiety of the people involving the emergency event, the emergency communication device is arranged to have a status indicator (LED) 330 for indicating the status of the emergency communication messages transmitted from the emergency communication device using indicators, for example, LED(s) having a capability for changing colors, and/or turning on and off.

When the emergency communication signals from the emergency communication device in the first vehicle 101 involving emergency event have been received by a plurality of vehicles passing through the communication distance of the emergency communication device in the first vehicle 101 involving emergency event, the quantity of the vehicles having received the emergency communication signals can be displayed by the indicator or LED(s) by turning on and off the indicator. Followings are examples for these status indicators and sound effects:

The emergency vehicle involving the emergency event:
1. GREEN LED ON: Normal status meaning the emergency communication device is working correctly.
2. RED LED ON: The emergency communication device is transmitting emergency communication signals.
3. RED LED FLASHING: At least one vehicle received the emergency communication signals. It is also possible to turn LED on and off in a predetermined time period to indicate the number of vehicles having received the emergency communication signals.
4. BLUE LED ON: Service Authority has received the emergency communication signals and is under the process for dispatching a service vehicle to the point where the vehicle having troubles is located.
5. BLUE LED FLASH: Service Authority has issued the information that Service Authority has received the emergency communication signals, and is under the process for dispatching a service vehicle to the point where the vehicle having troubles is located.
6. SOUND EFFECTS: When the on/off switch 320 is activated (turned on), beep sound is outputted from a speaker installed inside the emergency communication device for a certain predetermined time period, for example 2-10 seconds to notify people involving the emergency event that the emergency communication device is activated. It is not limited to continuous beep sound but it may be ring sounds or vivid sounds or combination thereof.

Vehicle passing through the communication distance from the emergency vehicle:
1. GREEN LED ON: Normal status meaning the emergency communication device is working correctly.
2. RED LED ON: The emergency communication device is receiving emergency communication messages from a vehicle involving emergency event.
3. GREEN LED FASHING: The emergency communication signals transmission has been completed.
4. GREEN LED ON: Resuming to a normal status because the emergency information from another vehicle has already transmitted to the Service Authority.
5. BLUE LED ON: There is a message to be transmitted to the vehicle having the emergency event.

Collaboration with Digital Devices Such as Smart Phone, Tables Having Display Functions When transmitting the emergency communication messages from the emergency communication device installed in a vehicle having troubles, it is important to transfer information including detailed status of the problems to the service authority to obtained useful and efficient assistance from the service authority. In order to input detailed information associated with the emergency event to the emergency communication device, it is possible to link the digital devices, such as smart devices, a smart phone and/or a tablet with the emergency communication device and input necessary information using application software(s) on the digital devices to add additional information. Followings are some examples or options to be selected.

Examples:

| 1. | Is problems related to life? | YES/NO |
|---|---|---|
| 2 | Any people injured? | YES/NO |
| 3. | Drivers license Number. if available: | |
| 4. | Any changes in Insurance information | YES/NO |
| | If YES, please input: Insurance company name, Policy Number | |
| 5. | Necessary towing vehicles? | YES/NO |
| 6. | Any gasoline necessary? | YES/NO |

Device specifiations

| | |
|---|---|
| Power voltage: | 12 volts cigar socket can be used. |
| Communication module installed: | Wi-Fi Direct ®, Bluetooth ® (Tethering) and GPS |
| Dimensions: | Cigar socket size |
| Antenna: | GPS and Wi-Fi ® External antenna |
| Communication capability: | GPS information (Location, time information, Device ID etc.) |

What is claimed is:

1. A method for establishing a communication between a first communication device in a first vehicle and a second communication device in a second vehicle via a broad-band medium, the method comprising the steps of:

determining, by the first communication device in the first vehicle, whether a mobile phone service is available when an emergency event of the first vehicle occurs;

obtaining, by the first communication device, current position information of the first vehicle;

setting, by the first communication device, a communication mode of the first communication device into an access point mode;

transmitting, by the first communication device, ID information and the current position information of the first vehicle;

recording, by the second communication device in the second vehicle, the ID information and the current position information of the first vehicle;

transmitting, by the second communication device in the second vehicle, the ID information of the first vehicle and position information of the second vehicle via a mobile phone to a service authority, when the second communication device fails to receive the current position information of the first vehicle, wherein, the ID information and the current position information of the first vehicle are recorded as a part of a Service Set Identification (SSID) of a data format of emergency communication; and setting, by the second communication device, a flag bit in the data format, which indicates that the position information of the second vehicle has been recorded instead of the current position information of the first vehicle when the second communication device fails to receive the current position information of the first vehicle.

2. The method of claim 1, further comprising:
changing, by the first communication device, color of lighting device or a sound aspect of a sound device installed in the first communication device when a status of emergency communication changes.

3. A method for establishing a communication between a first communication device in a first vehicle and a second communication device in a second vehicle via a broad-band medium, the method comprising the steps of:
obtaining, by a mobile device, ID information of the first vehicle;
transmitting by the mobile device, the ID information of the first vehicle to the first communication device;
storing, by the first communication device, the ID information into a memory in the first communication device;
determining, by the first communication device in the first vehicle whether a mobile phone service is available when an emergency event of the first vehicle occurs;
obtaining, by the first communication device, current position information of the first vehicle;
setting, by the first communication device, a communication mode of the first communication device into an access point mode;
transmitting, by the first communication device, communication data including the ID information and the current position information of the first vehicle;
recording, by the second communication device in the second vehicle, the communication data from the first vehicle;
transmitting, by the second communication device in the second vehicle, the ID information of the first vehicle and position information of the second vehicle via a mobile phone to a service authority, when the second communication device fails to receive the current position information of the first vehicle, wherein, the ID information and the current position information of the first vehicle are recorded as a part of a Service Set Identification (SSID) of a data format of emergency communication; and
setting, by the second communication device, a flag bit in the data format, which indicates that the position information of the second vehicle has been recorded instead of the current position information of the first vehicle when the second communication device fails to receive the current position information of the first vehicle.

4. The method of claim 3, wherein the ID information includes a VIN (Vehicle Identification Number) and/or a plate number.

5. The method of claim 4, further comprising:
capturing, by a camera installed in the mobile device, an image of the VIN or the plate number.

6. A method for establishing a communication between a first communication device in a first vehicle and a second communication device in a second vehicle via a broad-band medium, the method comprising the steps of:
determining, by the first communication device in the first vehicle whether a mobile phone service is available when an emergency event of the first vehicle occurs;
obtaining, by the first communication device, current position information of the first vehicle;
setting, by the first communication device, a communication mode of the first communication device into an access point mode;
transmitting, by the first communication device, ID information and the current position information of the first vehicle;
recording, by the second communication device in the second vehicle, the ID information and the current position information of the first vehicle;
transmitting, by the second communication device in the second vehicle, the ID information of the first vehicle and position information of the second vehicle via a mobile phone to a service authority, when the second communication device fails to receive the current position information of the first vehicle; and
setting, by the second communication device, a flag bit in the data format, which indicates that the position information of the second vehicle has been recorded instead of the current position information of the first vehicle when the second communication device fails to receive the current position information of the first vehicle.

7. The method of claim 6, further comprising:
changing, by the first communication device, color of lighting device or a sound aspect of a sound device installed in the first communication device when a status of emergency communication changes.

* * * * *